R. W. ERWIN.
PROCESS OF MAKING ACETATE OF LIME.
APPLICATION FILED AUG. 9, 1905.
927,135.
Patented July 6, 1909.
2 SHEETS—SHEET 1.
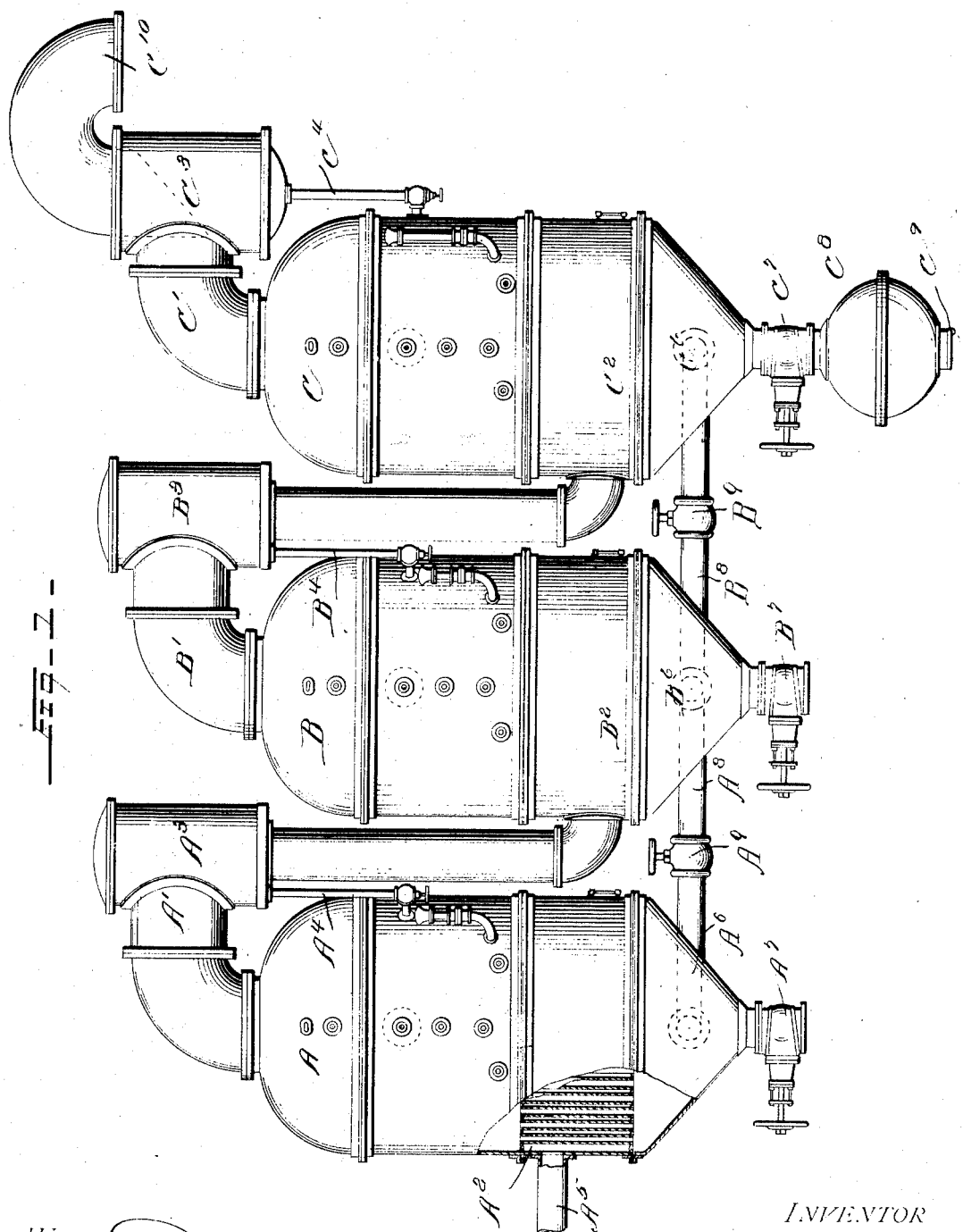
INVENTOR
Robert W. Erwin,
By E. B. Stocking
Attorney
WITNESSES:

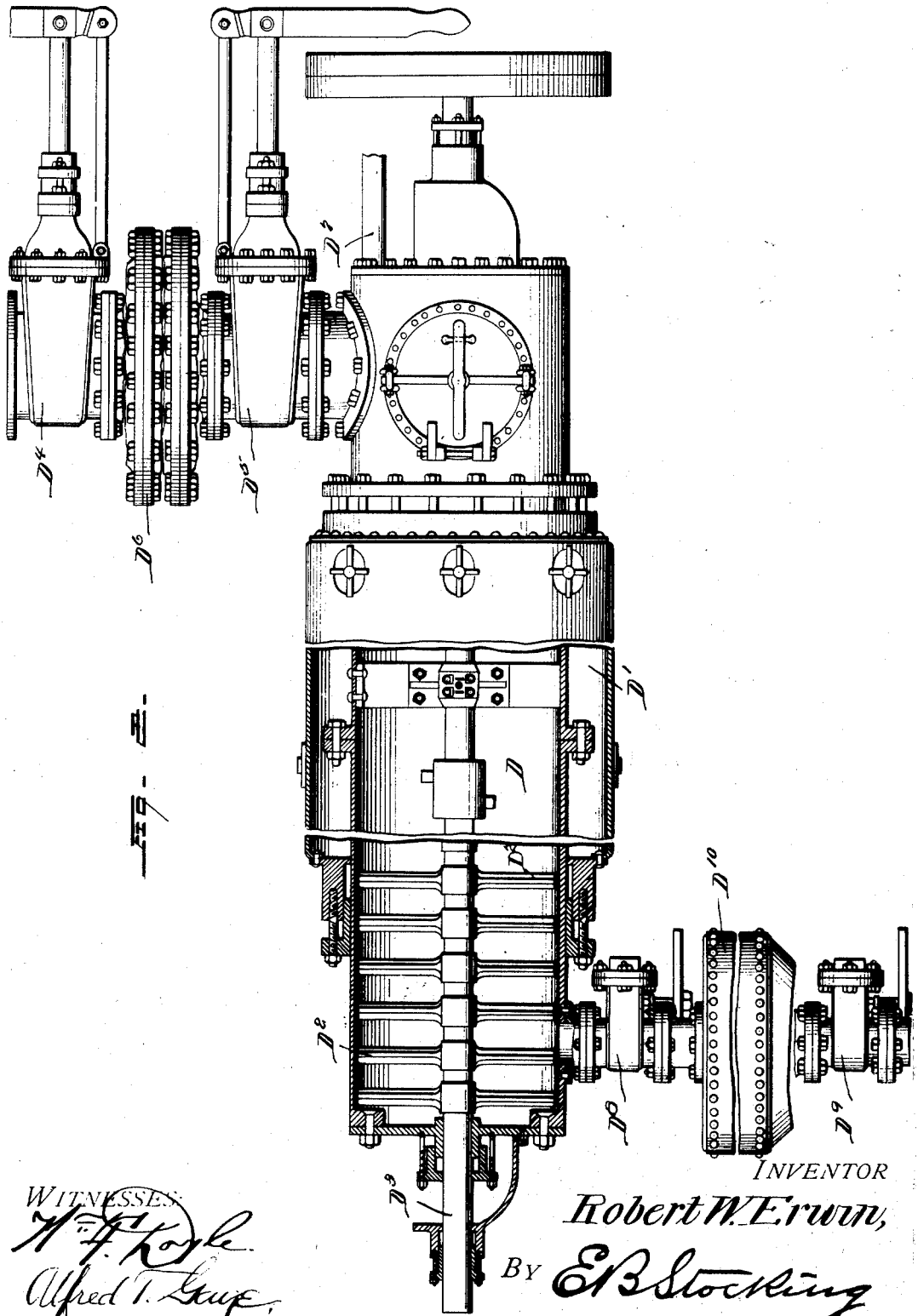

UNITED STATES PATENT OFFICE.

ROBERT W. ERWIN, OF ST. LOUIS, MISSOURI.

PROCESS OF MAKING ACETATE OF LIME.

No. 927,135.　　　　Specification of Letters Patent.　　　　Patented July 6, 1909.

Application filed August 9, 1905. Serial No. 273,453.

To all whom it may concern:

Be it known that I, ROBERT W. ERWIN, a citizen of the United States, residing at St. Louis, in the county of St. Louis City, State of Missouri, have invented certain new and useful Improvements in Processes of Making Acetate of Lime, of which the following is a specification, reference being had therein to the accompanying drawing.

This invention relates to a process of making acetate of lime, and particularly to an improved method of removing the liquid matter therefrom by evaporation so as to concentrate the resultant product.

The invention has for an object to produce this evaporation or concentration in a vacuum chamber, and to further dry the product from the vacuum chamber in a vacuum so as to produce a high grade of the acetate of lime, prevent chemical changes, and the resulting chemical reactions which are brought about when the evaporation is produced by a high temperature in a vessel exposed to atmospheric pressure. The evaporation and drying of the acetate in a vacuum prevents the phenyl and other hydrocarbon compounds therein from decomposing in the acetate and giving the same an objectionable color instead of the white product which can be procured in a vacuum process. The vacuum evaporation and drying produces a product of lighter color retaining the highest percentage of acetic acid at approximately two thirds of the cost of an open evaporation.

Other and further objects of the invention will be hereinafter set forth and the novel features thereof defined in the appended claim.

In the drawings:—Figure 1 is an elevation with parts in section of a multiple effect vacuum evaporating apparatus, and Fig. 2 is a similar view of a vacuum drying apparatus.

The process may be carried into effect by any desirable apparatus suitable for the purpose, and that herein shown and described constitutes means found particularly efficient in carrying out the process.

In the apparatus illustrated, the evaporating means shown in Fig. 1 comprises a series of vessels A, B and C connected together at their upper portions by means of vapor pipes $A'$ and $B'$ extending to steam spaces $B^2$ and $C^2$ of the chambers B and C, respectively, these pipes being provided at their upper portion with catch all chambers $A^3$, $B^3$ and $C^3$ which are connected to the vapor spaces of the chambers by conducting pipes $A^4$, $B^4$ and $C^4$. The steam space $A^2$ of the primary chamber A is heated by steam from any suitable source conducted through the pipe $A^5$ thereto, and the vapor from the liquid boiled in this chamber passes over into the steam space of the chamber B thus heating that chamber, and the vapor therefrom passes to the steam space of the chamber C as usual in multiple effect evaporating apparatus. Each of the chambers is provided at its lower portion with a collecting chamber $A^6$, $B^6$ and $C^6$, chambers $A^6$ and $B^6$ being provided with suitable draw off valves $A^7$ and $B^7$, while chamber $C^6$ is provided with a similar valve $C^7$ and with an acetate chamber $C^8$ provided with a pivoted flap valve $C^9$ adapted to be held closed by the vacuum within the apparatus. The vapor pipe $C'$ from the final chamber C of the series is provided with a connection $C^{10}$ to which any desired form of vacuum apparatus may be applied, for instance, a vacuum pump. For the purpose of effecting a circulation of liquid between these several chambers a pipe $A^8$ provided with a valve $A^9$ extends between the chambers A and B, and a similar pipe $B^8$ having a valve $B^9$ extends between the chambers B and C.

The apparatus illustrated for carrying the process into effect comprises a cylinder D surrounded by a steam jacket $D'$ for the purpose of heating the same, and provided with a series of stirrers $D^2$ mounted upon the shaft $D^3$ in the ordinary manner, said cylinder being provided at one end with alternately operating valves $D^4$ $D^5$ separated by a feeding chamber $D^6$ adapted to maintain a vacuum as the material is introduced to the cylinder, and also communicates at one end with a pipe connection $D^7$ extending to a suitable vacuum producing apparatus such as a pump. The opposite or delivery end of the cylinder is provided with alternately operating valves $D^8$, $D^9$ separated by a delivering chamber $D^{10}$ in which dry material is deposited when the valve $D^8$ is opened and from which it may be discharged when said valve is closed and the valve $D^9$ is opened. It will be seen that the material entering this drier from the evaporating apparatus is maintained within the vacuum at all times until all moisture is removed therefrom and consequent danger of chemical reaction avoided.

The acetate liquid to be evaporated and dried in order to secure the commercial acetate of lime or calcium is produced in any desired manner, for instance, the crude pyroligneous acid after being freed of its tarry constituents is subjected to distillation by a vacuum or any other system and then mixed with a suitable lime product, preferably milk of lime, powdered caustic lime or hydrated lime and properly agitated to thoroughly mix the ingredients until a neutral point is reached when a slight excess of lime is added. This liquor is then passed to a vacuum evaporator where it is evaporated to a wet granular condition containing from fifteen to twenty-five percent. moisture, from which it passes to the vacuum drier and there dried until the acetate contains no more than five per cent. moisture. The higher or more complete the vacuum during this evaporating and drying process the more nearly will the acetate approach a chemically pure state.

In the apparatus shown the chambers A and B are filled to a proper level above the steam jacket, the air exhausted and the steam applied to bring the liquid to a boiling point, where it is concentrated or evaporated until the liquid in the first vessel reaches a specific gravity of substantially 1.08. The valve of the circulating pipe is then opened and the liquor passes to the second vessel and the concentration continued until the specific gravity reaches substantially 1.12, the liquid is then passed to the third vessel where it is concentrated until it begins to crystallize which takes place at about 1.16 specific gravity, and the crystals drop into the acetate chamber beneath this vessel. The material is then passed to a vacuum drier from which a large percentage of the remaining moisture is removed as it is carried therethrough by the stirrers.

By the foregoing vacuum process an acetate of lime from 86 to 92 per cent. chemically pure is produced and white in color showing no tarry matter or products of decomposition. This discoloration or decomposition is often produced by the high temperature necessary to evaporate and dry the product in an ordinary open pan, or apparatus exposed to atmospheric pressure, and is entirely avoided by carrying out the evaporating and drying process in a vacuum whereby a product higher in acetic acid and of much better color is produced as the phenyl and other hydrocarbon compounds are prevented from decomposing in the acetate and a white product secured, in which the chemical reactions or changes due to high temperature in the presence of air are entirely avoided.

Having now described my invention and set forth its merits what I claim and desire to secure by Letters Patent is:—

The process of making acetate of lime consisting in evaporating a solution thereof in vacuum until the liquid reaches a specific gravity of substantially 1.08, continuing said evaporation in another vessel until the specific gravity of the liquid reaches substantially 1.12, further evaporating the liquid in an independent vessel until the specific gravity thereof reaches substantially 1.16 or at the point of crystallization, and subsequently drying said crystals in vacuum.

In testimony whereof, I affix my signature in presence of two witnesses.

ROBERT W. ERWIN.

Witnesses:
PETER H. MILLER,
A. S. EATON.